United States Patent
Bengtsson et al.

(10) Patent No.: US 11,398,851 B2
(45) Date of Patent: *Jul. 26, 2022

(54) OPERATING A CELLULAR MIMO SYSTEM

(71) Applicant: SONY GROUP CORPORATION, Tokyo (JP)

(72) Inventors: Erik Bengtsson, Eslöv (SE); Zhinong Ying, Lund (SE)

(73) Assignee: SONY GROUP CORPORATION, Tokyo (JP)

( * ) Notice: Subject to any disclaimer, the term of this patent is extended or adjusted under 35 U.S.C. 154(b) by 138 days.

This patent is subject to a terminal disclaimer.

(21) Appl. No.: 16/074,887

(22) PCT Filed: Feb. 8, 2016

(86) PCT No.: PCT/EP2016/052601
§ 371 (c)(1),
(2) Date: Aug. 2, 2018

(87) PCT Pub. No.: WO2017/137059
PCT Pub. Date: Aug. 17, 2017

(65) Prior Publication Data
US 2019/0044579 A1 Feb. 7, 2019

(51) Int. Cl.
*H04L 12/00* (2006.01)
*H04B 7/0404* (2017.01)
(Continued)

(52) U.S. Cl.
CPC ......... *H04B 7/0404* (2013.01); *H04B 7/0413* (2013.01); *H04B 7/0452* (2013.01);
(Continued)

(58) Field of Classification Search
None
See application file for complete search history.

(56) References Cited

U.S. PATENT DOCUMENTS

2009/0075686 A1* 3/2009 Gomadam ........... H04B 7/0617
455/500
2012/0082192 A1* 4/2012 Pelletier ............... H04B 7/0678
375/219
(Continued)

FOREIGN PATENT DOCUMENTS

CN 103141053 A 6/2013
WO 2012044967 A1 4/2012
(Continued)

OTHER PUBLICATIONS

International Search Report and Written Opinion of the International Searching Authority corresponding to International Patent Application No. PCT/EP2016/052601 dated Oct. 21, 2016 (12 pages).

*Primary Examiner* — Noel R Beharry
*Assistant Examiner* — Lionel Preval
(74) *Attorney, Agent, or Firm* — Myers Bigel, P.A.

(57) ABSTRACT

Operating a cellular multiple-input and multiple-output system including a first device having an antenna array having a plurality of antennas, and a second device having at least two antennas includes a same uplink pilot signal broadcast from each antenna of the second device, and received at the antenna array of the first device. Depending on the received same uplink pilot signal, a first set of first device receiving parameters for the antenna array is determined. From each antenna of the at least two antennas of the second device, a corresponding uplink pilot signal is sent and received at the antenna array of the first device using the first set of first device receiving parameters. At the first device, for each received uplink pilot signal, a corresponding second set of first device receiving parameters is determined depending on the plurality of received orthogonal uplink pilot signals.

14 Claims, 3 Drawing Sheets

(51) Int. Cl.
  *H04B 7/0452*  (2017.01)
  *H04B 7/08*   (2006.01)
  *H04L 25/02*  (2006.01)
  *H04B 7/0413* (2017.01)
  *H04L 5/00*   (2006.01)

(52) U.S. Cl.
  CPC ......... *H04B 7/0862* (2013.01); *H04L 5/0007* (2013.01); *H04L 5/0048* (2013.01); *H04L 25/0204* (2013.01); *H04L 25/0224* (2013.01)

(56) References Cited

U.S. PATENT DOCUMENTS

| | | | | |
|---|---|---|---|---|
| 2015/0016379 | A1* | 1/2015 | Nam | H04B 7/0639 |
| | | | | 370/329 |
| 2015/0092621 | A1* | 4/2015 | Jalloul | H04L 5/1461 |
| | | | | 370/278 |
| 2015/0163036 | A1* | 6/2015 | Thomas | H04L 5/0007 |
| | | | | 370/281 |
| 2015/0365147 | A1 | 12/2015 | Ketchum et al. | |
| 2016/0134438 | A1* | 5/2016 | Marzetta | H04L 25/0228 |
| | | | | 370/315 |
| 2016/0352479 | A1* | 12/2016 | Larsson | H04L 5/0048 |
| 2018/0076881 | A1* | 3/2018 | Zhu | H04B 7/0434 |

FOREIGN PATENT DOCUMENTS

| | | |
|---|---|---|
| WO | 2015022577 A1 | 2/2015 |
| WO | 2015/169358 A1 | 11/2015 |

* cited by examiner

OPERATING A CELLULAR MIMO SYSTEM

CROSS REFERENCE TO RELATED APPLICATIONS

This application is a 35 U.S.C. § 371 national stage application of PCT International Application No. PCT/EP2016/052601, filed on Feb. 8, 2016, the contents of which are incorporated herein by reference in its entirety. The above-referenced PCT International Application was published in the English language as International Publication No. WO 2017/137059 A1 on Aug. 17, 2017.

FIELD OF THE INVENTION

The present invention relates to cellular communication systems, in particular, to a method and devices for operating a cellular multiple-input and multiple-output (MIMO) system.

BACKGROUND OF THE INVENTION

The increasing growth of mobile data and voice communication requires that communication needs of a large number of users must be met, even in situations in which a large number of users are located within a small area. Such a situation is referred to as dense crowd scenario in the art. Typical examples include sports arenas, shopping malls or large office buildings.

In order to increase data transmission performance and reliability, the so-called multiple-input and multiple-output (MIMO) technology may be used in a wireless radio telecommunication system for transmitting information between a base station and a user equipment, for example mobile devices like mobile telephones, mobile computers, tablet computers, wearable devices and stationary devices like personal computers or cash registers.

MIMO systems may use multiple send and receive antennas for wireless communication at a base station as well as at the user equipment. The MIMO technology forms the basis for coding techniques which use the temporal as well as the spatial dimension for transmitting information. The enhanced coding provided in MIMO systems allows the spectral and the energy efficiency of the wireless communication to be increased.

The spatial dimension may be used by spatial multiplexing. Spatial multiplexing is a transmission technique in MIMO wireless communication to transmit independent and separately encoded data signals, so-called streams, from each of the multiple transmit antennas, or a combination there of. Therefore, the space dimension is reused, or multiplexed, more than one time.

If the transmitter is equipped with Nt antennas and the receiver has Nr antennas, the maximum spatial multiplexing order Ns (the number of streams or the rank) is Ns=min (Nt, Nr). This means that Ns streams can be transmitted in parallel, ideally leading to an Ns increase of the spectral efficiency (the number of bits per second and per Hz that can be transmitted over the wireless channel). For example, a MIMO system with a base station having two antennas and a user equipment having two antennas may operate at a rank of up to 2 and is also called 2×2 MIMO, indicating the number of antennas at the base station and at the user equipment. However, the rank is limited by the device having the lower number of antennas, typically the user equipment.

In a so-called massive MIMO system, the base station may include a large number of antennas, for example several tens or even in excess of one hundred antennas with associated receiver circuitry. The large number of antennas of the massive MIMO base station allow radio energy to be spatially focused in transmissions as well as a directional sensitive reception which improves spectral efficiency and radiated energy efficiency.

In order to adapt the transmit signal at each individual antenna of the base station in accordance with the currently active receiving user equipment, a base station logic needs information about radio channel properties between the user equipment and the antennas of the base station. Vice versa, in order to adapt the transmit signal at each individual antenna of the user equipment, a user equipment logic needs information about the radio channel properties between the base station and the antennas of the user equipment.

A pilot signaling scheme can be used for this purpose which allows the base station to set configuration antenna parameters for transmitting signals, so as to focus radio energy at the user equipment, or for receiving radio signals from the user equipment. Likewise, the pilot signaling scheme can be used to enable the user equipment to set antenna configuration parameters for transmitting signals, so as to focus radio energy at the base station, or for receiving radio signals from the base station.

Thus, focus may mean both, phase align contributions with different path lengths and transmissions only in directions that will reach the user equipment and base station, respectively. In a conventional MIMO system, training sequences may be transmitted from all user equipment within the cell and possibly also neighboring cells in a time slot which is dedicated to the respective user equipment. The training sequences need to be orthogonal in order for the base station to identify the configuration parameters for the plurality of antennas for each one of the user equipment devices in conventional systems. Orthogonality may be achieved by using time division multiple access (TDMA), code division multiple access (CDMA) or frequency division multiple access (FDMA) technologies or a combination thereof. Orthogonality may be achieved also by a combination of the above, hence, for example different time—frequency resource blocks may be allocated to different user equipment devices in an OFDM precoded system.

In case the MIMO system uses time division multiple access (TDMA), each user equipment may transmit a pilot signal in an assigned time slot, which may be received by the antennas of the base station and analyzed by the base station logic. It will be appreciated that time slots are one example of orthogonal channels, with orthogonality being attained in the time domain. In order to not interfere with each other, a certain time period can be assigned in each system frame where each user equipment may transmit its pilot signal. The pilot signals may each include a training sequence with the pilot signal received at the plurality of antennas of the base station being analyzed by the base station logic. Information about a radio channel property of the radio channel between the user equipment and the plurality of antennas may be obtained as a result of the analysis. The base station may use the results of the analysis to determine configuration parameters for transmitting signals via the antennas to the respective user equipment. Vice versa, the base station may transmit a pilot signal in an assigned timeslot, which may be received by the antennas of the user equipment and analyzed by the user equipment logic to obtain a radio channel property of the radio channel between the base station and the antennas of the user equipment. The user equipment may use the results to determine configuration parameters for transmitting signals via its antennas to the base station.

Massive MIMO systems (MaMi) may be deployed in buildings such as office buildings, shopping malls, sports arenas or other areas in which a large density of users can occur. In such environments, a large number of user equipment devices may be located in a cell served by the MIMO base station. The time required for the pilot signaling of the user equipment in each frame may increase with the number of user equipment devices. For a large number of user equipment devices, the time required for all user equipment devices to transmit their pilot signals may exceed the available pilot signaling time in each frame. While the pilot signaling time, i.e. the number of time slots allocated to the pilot signaling, may be adjusted dynamically, the transmission of payload data would be negatively affected if the pilot signaling time was increased too much. Therefore, the resources for transmitting pilot signals are limited. The pilot resources may also be shared with neighbor cells and therefor hard to dynamically adjust.

The pilot signals are send from the user equipment to the MIMO base station, i.e., in the uplink direction. Likewise, pilot signals may be sent from the MIMO base station to the user equipment, i.e., in the downlink direction. Therefore, uplink and downlink data transmissions are based on the quality of the uplink and downlink pilot signals. If there is interference during the pilot signal transmission, the sounded channel will be affected. The interference may originate from neighbor cells. Furthermore, for mobility reasons, the validity of the channel as defined by the configuration parameters is limited. A new pilot signal needs to be transmitted at regular terms, for example at about every millisecond. Therefore, the transmission of pilot signals requires a considerable amount of resources. In order to keep the ratio between payload and pilot signal overhead large, the number of orthogonal pilot channels needs to be kept as small as possible.

In view of the above, there is a need in the art for methods and devices which address at least some of the above short comings of conventional MIMO systems. There is in particular a need in the art for improving operation of a multiple-input and multiple-output (MIMO) system during pilot signaling such that resources for pilot signaling are saved and less interference may occur.

SUMMARY OF THE INVENTION

According to the present invention, this object is achieved by the features of the independent claims. The dependent claims define preferred and advantageous embodiments of the invention.

According to the present invention, a method for operating a cellular multiple-input and multiple-output (MIMO) system is provided. The cellular MIMO system comprises a first device, for example a base station, having an antenna array comprising a plurality of antennas, and second device, for example user equipment, comprising at least two antennas. According to the method, a same uplink pilot signal is broadcasted from each antenna of the at least two antennas of the second device. In other words, the very same uplink pilot signal is sent from each antenna of the at least two antennas of the second device at the same time, i.e. simultaneously. The same uplink pilot signal from the second device is received at the antenna array of the first device. At the first device, a first set of first device receiving parameters is determined for the antenna array depending on the received same uplink pilot signal. Then, from each antenna of the at least two antennas of the second device a corresponding uplink pilot signal of a plurality of uplink pilot signals is sent. The plurality of uplink pilot signals are orthogonal to each other. The orthogonal uplink pilot signals from the second device are received at the antenna array of the first device using the first set of first device receiving parameters. Based on the plurality of received orthogonal uplink pilot signals, for each received uplink pilot signal of the plurality of uplink pilot signals a corresponding second set of first device receiving parameters is determined at the first device for the antenna array of the first device.

For example, in case the first device is a base station and the second device is a user equipment, according to the above-described method, the same uplink pilot signal is broadcasted from each antenna of the at least two antennas of the user equipment and is received at the antenna array of the base station. The base station determines the first set of base station receiving parameters for the antenna array depending on the received same uplink pilot signal. This enables the base station to focus its receive direction to the antennas of the user equipment. Next, from each antenna of the at least two antennas of the user equipment a corresponding uplink pilot signal of the plurality of orthogonal uplink pilot signals is sent to the base station. By using the first set of base station receiving parameters, the base station receives the plurality of orthogonal uplink pilot signals.

As the receive characteristics of the antenna array of the base station is focused to the user equipment by using the first base station receiving parameters, the same orthogonal uplink pilot signals may be used at the same time by another user equipment for transmitting uplink pilot signals to the base station in parallel.

Accordingly, in another embodiment of the present invention, the cellular MIMO system comprises a further second device comprising at least two antennas, for example a further user equipment. The further second device broadcasts a further same uplink pilot signal from each antenna of the at least two antennas of the further second device. The further same uplink pilot signal from the further second device is received at the antenna array of the first device, for example the base station. The further same uplink pilot signal of the further second device is orthogonal to the same uplink pilot signal of the second device described above. At the first device, a third set of first device receiving parameters for the antenna array is determined depending on the received further same uplink pilot signal. Next, from each antenna of the at least two antennas of the further second device a corresponding uplink pilot signal of the plurality of uplink pilot signals is sent, wherein the corresponding uplink pilot signals may be the same as the corresponding uplink pilot signals sent from each antenna of the at least two antennas of the second device. Furthermore, the corresponding uplink pilot signals are sent at the same time from the second device and the further second device to the first device. The uplink pilot signals sent from the further second device are received at the antenna array of the first device using the third set of first device receiving parameters. Finally, at the first device, for each uplink pilot signal received from the further second device a corresponding fourth set of first device receiving parameters for the antenna array is determined depending on the plurality of received orthogonal uplink pilot signals. Thus, transmission resources for uplink pilot signals may be saved.

To sum up, the base station may determine for each of the received orthogonal uplink pilot signals from each user equipment a corresponding second set of base station receiving parameters for the antenna array based on the plurality of received orthogonal uplink pilot signals. The plurality of second sets of base station receiving parameters enables the base station to receive a plurality of payload data streams from the different antennas of the different user equipment devices in parallel.

It is to be noticed that the roles of the first device and the second device may be vice versa, i.e., the first device may be a user equipment and the second device may be a base station. In this case, the term "uplink" relates to a communication from the base station to the user equipment and the term "downlink" relates to the opposite communication direction from the user equipment to the base station. Providing the antenna array at the user equipment may be in particular advantageous in connection with a user equipment operating at higher frequencies, for example above 20 GHz. In this case, the base station may focus the energy into more or less static sectors and a dynamic operation, i.e. focusing and directing, is performed in the user equipment.

Additionally, the first and second devices may be both user equipment devices, for example in a relay configuration or in a device-to-device communication.

Furthermore, the term "antenna" may indicate an antenna structure or an antenna port to which multiple antenna elements may be coupled.

The antenna array of the first device may comprise a plurality of antenna arrays which may be arranged spatially separated. In case the first device is a base station, the antenna arrays may be spaced apart in a distance of up to a few meters, for example in a distance of 1 to 5 m, if the antenna arrays are arranged at the same base station. Furthermore, the antenna arrays may be distributed over several cooperating base stations. In this case a distance between the antenna arrays may be in a range of up to 100 m, up to 1000 m, or even in excess of 1000 m. In case the first device is a user equipment, two or more antenna arrays may be arranged in a distance of a few centimeter, for example in a distance of 10 to 15 cm, for example one antenna array at a top side and another antenna array a bottom side of the user equipment. By the spatial separation of the antenna arrays of the first device, a higher rank operation is enabled by transmitting different data streams for each of them. There may be at least as many antennas at the second device as the intended rank and therefore the data streams may be separated in the same way as in today's 2×2 MIMO. However, at the beginning of the method described above, the second device transmits the same uplink pilot signal from all antennas at the same time and the antenna array of the first device receives the same pilot and uses it to configure the antenna array for independent massive MIMO operation. Thus, by using the same uplink pilot signal as described above, a higher rank operation with a single pilot resource is enabled.

According to an embodiment, the method comprises furthermore sending corresponding uplink payload data via each antenna of the at least two antennas of the second device. The uplink payload data is received at the antenna array of the first device using the second sets of first device receiving parameters. Due to the second sets of first device receiving parameters, the first device can separate different uplink payload data streams from the different antennas of the second device. Therefore, the second device can transmit independent payload data streams to the first device from each antenna.

According to a further embodiment of the present invention, for at least one or each second set of first device receiving parameters a corresponding set of first device transmission parameters is determined. The corresponding set of first device transmission parameters is configured to focus a downlink signal from the antenna array of the first device to that antenna of the second device from which the corresponding uplink pilot signal was received. In other words, the first device determines transmission parameters which focus a downlink signal to one specific antenna of the second device. Such, pre-coded downlink payload data streams are sent to corresponding antennas of the second device, which may be separated by the second device. This enables transmitting a plurality of payload data streams in parallel from the first device to the second device using the spatial coding.

Consequently, according to another embodiment of the present invention, downlink payload data is sent from the antenna array of the first device using the corresponding set of first device transmission parameters. Additionally, or as an alternative, according to another embodiment of the present invention, a downlink pilot signal is sent from the antenna array of the first device using the corresponding set of first device transmission parameters. The downlink pilot signal may be received at that antenna of the second device from which the corresponding uplink pilot signal was sent to and received at the first device. At the second device, a corresponding set of second device receiving parameters is determined for that antenna, for which the corresponding uplink pilot signal was sent to and received at the first device, based on the received downlink pilot signal.

The downlink pilot signals may additionally be used for further purposes, for example calibrating a channel coding, for example a 64QAM constellation.

In a further embodiment, corresponding downlink payload data is sent via the antenna array of the first device using the corresponding set of first device transmission parameters, and the downlink payload data is received at that antenna of the second device, from which the corresponding uplink pilot signal was received at the first device, using the set of second device receiving parameters.

In other words, in case the first device is a base station and the second device is user equipment, after the same uplink pilot signal has been sent from each antenna of the user equipment to the base station, orthogonal uplink pilot signals are received pre-coded according to the same uplink pilot signal from each antenna of the user equipment at the base station. The base station uses the orthogonal uplink pilot signals to determine receive and transmit parameters for its antenna array focused on the corresponding antennas of the user equipment. Then, downlink pilot signals are transmitted pre-coded from the base station to each antenna of the user equipment, and the user equipment determines corresponding receiving parameters for each of its antennas. This enables a bi-directional payload data communication between the user equipment and the base station using a spatial coding such that a plurality of payload data streams may be transmitted in parallel using the same radio frequency resources.

However, the above described embodiment may require a considerable amount of processing time at the first device for determining the corresponding set of first device transmission parameters additionally to the corresponding second set of first device receiving parameters. In detail, the first device needs some processing time to process the same uplink pilot signal in order to determine the first set of first device receiving parameters and to detect the plurality of orthogonal uplink pilot signal. Then the first device needs some processing time to process the plurality of orthogonal uplink pilot signal in order to determine the second set of first device receiving parameters and additionally the first device needs some processing time for determining the set of first device transmission parameters.

Therefore, according to another embodiment, predefined codebook information may be used at the first and second devices for coding and decoding downlink payload data. In detail, for each received orthogonal uplink pilot signal a corresponding pre-coding for a corresponding downlink pilot signal and a corresponding downlink payload data stream is selected from the predefined codebook. The downlink pilot signal and downlink payload data stream are pre-coded at the first device with the selected pre-coding and sent from the first device to the second device. At the second device, the pre-coded downlink pilot signal and downlink payload data stream are received at the at least two antennas. The second device is capable of separating the different corresponding pre-coded downlink payload data streams by using a corresponding decoding from the predefined codebook. The downlink pilot signal may be used to indicate the selected pre-coding to the second device, and the second device may use this information to distinguish between the payload data streams as there will most likely be cross talk. Thus, the additional processing time in the first device for determining the set of first device transmission parameters can be avoided. However, some more processing may need to take place in the second device.

Furthermore, there may not always be a need for transmitting downlink pilot signals, as the first device may focus the downlink payload data streams to the individual antennas of the second device, and for example zero forcing may be used to make sure that there is no cross talk.

According to another aspect of the present invention, a device for a cellular multiple-input and multiple-output (MIMO) system is provided. The device comprises an antenna array comprising a plurality of antennas and a logic coupled to the antenna array. The device may act as the "first device" described in the method above and the embodiments thereof. The logic is configured to receive a same uplink pilot signal from a further device (for example the "second device" in the method described above) of the MIMO system at the antenna array. The same uplink pilot signal is broadcasted from the further device from each antenna of at least two antennas of the further device. The logic is furthermore configured to determine a first set of device receiving parameters for the antenna array depending on the received same uplink pilot signal. Next, the device receives a plurality of uplink pilot signals at the antenna array using the first set of device receiving parameters. The plurality of uplink pilot signals may be sent from the further device. For each received uplink pilot signal of the plurality of uplink pilot signals a corresponding second set of device receiving parameters for the antenna array is determined depending on the plurality of received orthogonal uplink pilot signals.

According to the present invention furthermore a device for a cellular multiple-input and multiple-output (MIMO) system is provided. The device comprises at least two antennas and a logic coupled to the at least two antennas. The device may act as the "second device" of the above described method and embodiments thereof. In particular, the device may comprise for example a user equipment. The logic is configured to broadcast a same uplink pilot signal from each antenna of the at least two antennas. After that, the logic sends from each antenna of the at least two antennas a corresponding uplink pilot signal of a plurality of uplink pilot signals, wherein the uplink pilot signals of the plurality of uplink pilot signals are orthogonal to each other.

In other words, in case the device with the antenna array is a base station and the device with the at least two antennas is a user equipment, the same uplink pilot signal is sent from each antenna of the user equipment to the base station. Based on this same uplink pilot signal the base station determines a first set of the base station receiving parameters for the antenna array. Thereafter, for each antenna of the user equipment a corresponding uplink pilot signal is transmitted from the user equipment to the base station. The corresponding uplink pilot signals are received pre-coded according to the same uplink pilot signal and are orthogonal to each other. By using the first set of base station receiving parameters, the corresponding uplink pilot signals received from the user equipment can be decoded and distinguished from uplink pilot signals received at the same time from another user equipment. Thus, the amount of required system resources for pilot signaling may be reduced.

As described above, the first device may comprise a base station and the second device may comprise a user equipment. However, the roles of the first device and the second device may be vice versa such that the first device comprises a user equipment and the second device comprises a base station.

For example, the user equipment may comprise a mobile telephone, a mobile computer, a tablet computer, a smart wearable device or a smart mobile accessory. A smart mobile accessory or a smart wearable device may comprise a wearable computer, also known as body-borne computer or simply wearable, which is a miniature electronic device that may be worn by a user under, with or on top of clothing.

Furthermore, according to the present invention, a cellular multiple-input and multiple-output system, a so-called MIMO system, is provided. The MIMO system comprises both kinds of devices, the first device and at least one second device.

Determining receive and/or transmission parameters as it is defined in the above summary of the present invention, may include analyzing a training sequence of a pilot signal received at the antennas of the first device or second device for obtaining information about a radio channel property of the radio channel between the antennas of the second device and the antennas of the first device according to MIMO concepts. The first device may use the results of the analysis to determine configuration parameters for transmitting and receiving signals via the antennas to and from the respective second device according to MIMO concepts. The second device may use the results of the analysis to determine configuration parameters for transmitting and receiving signals via its antennas to and from the first device according to MIMO concepts.

Furthermore, although in the above summary of the present invention, reference is primarily made to MIMO systems, the above described methods and devices may in particular be advantageously used in massive MIMO systems (MaMi). In a massive MIMO system, the first device, for example a base station, may include a large number of antennas, for example several tens or even in excess of one hundred antennas with associated receiver circuitry.

Although specific features described in the above summary and the following detailed description are described in connection with specific embodiments and aspects of the present invention, it should be understood that the features of the exemplary embodiments and aspects may be combined with each other unless specifically noted otherwise.

BRIEF DESCRIPTION OF THE DRAWINGS

The present invention will now be described in more detail with reference to the accompanying drawings.

DETAILED DESCRIPTION OF PREFERRED EMBODIMENTS

In the following, exemplary embodiments of the present invention will be described in more detail. It is to be understood that the features of the various exemplary embodiments described herein may be combined with each other unless specifically noted otherwise. Same reference signs in the various drawings refer to similar or identical components. Any coupling between components or devices shown in the figures may be a direct or indirect coupling unless specifically noted otherwise.

Figure 1:
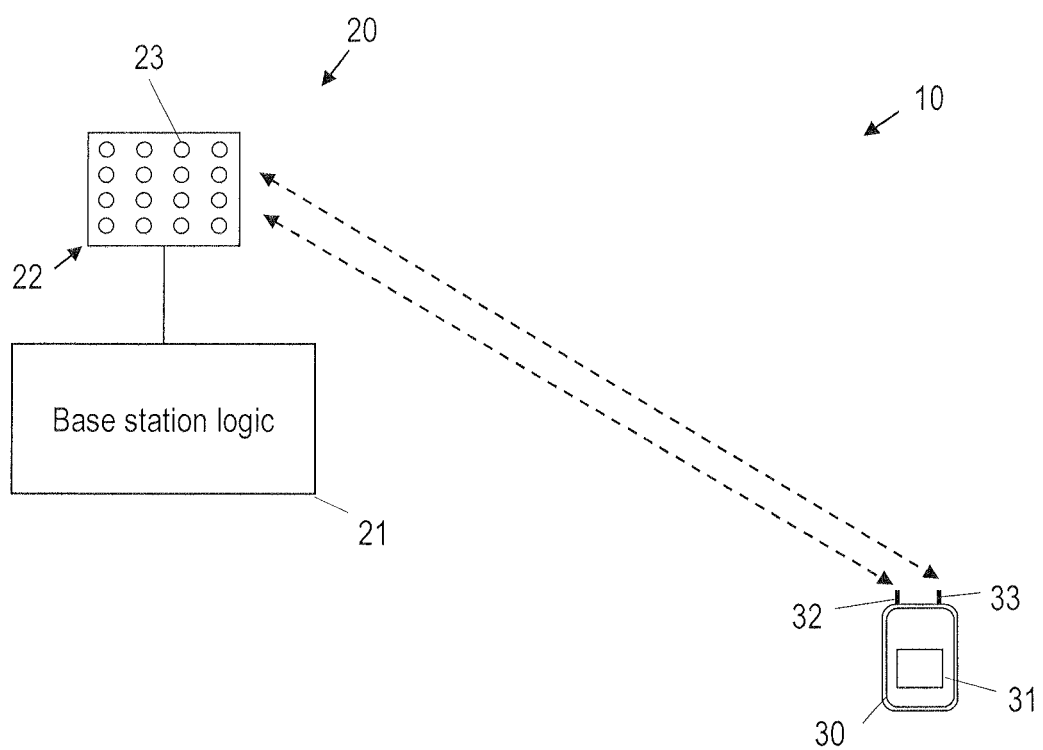
FIG. 1 shows schematically a cellular multiple-input and multiple-output system according to an embodiment of the present invention.

FIG. 1 shows a communication system 10 according to an embodiment. The communication system 10 is a multiple-input and multiple-output (MIMO) system and includes a MIMO base station 20. The MIMO communication system 10 may be a massive MIMO system (MaMi), and the MIMO base station 20 may have a large number of antennas, for example several tens or in excess of one hundred antennas.

The base station 20 comprises a plurality of antennas which are indicated by circles in FIG. 1. One exemplary antenna of the plurality of antennas is referenced by reference sign 23. The antennas 23 may be arranged in a two-dimensional or three-dimensional antenna array 22 on a carrier. The base station 20 may comprise furthermore associated (not shown) transceivers for the antennas 23. The base station 20 may be a base station for a massive MIMO system. Accordingly, the base station 20 may have several tens or in excess of one hundred antennas 23. The base station 20 comprises furthermore a base station logic 21. The base station logic 21 may comprise for example a controller, a computer or a microprocessor. Although in FIG. 1 only one antenna arrays 22 is shown, the base station 20 may comprise more than one antenna array, for example two, three, four or five or even more, for example several tens of antenna arrays, which may cooperate with each other and which may be arranged near each other or spaced apart.

In the communication system 10, a plurality of user equipment devices like mobile phones, mobile and stationary computers, tablet computers, smart wearable devices or smart mobile accessories may be arranged. An exemplary user equipment 30 is shown in FIG. 1. The user equipment 30 may be configured to communicate with the base station 20.

The user equipment 30 comprises at least two antennas 32, 33 and a logic 31. The logic 31 may comprise for example a controller or microprocessor. The user equipment 30 may comprise more components, for example a graphical user interface and a battery, but these components are not shown in FIG. 1 for clarity reasons. Although in FIG. 1 only two antennas 32, 33 are shown, the user equipment 30 may comprise any number of antennas, for example three, four or even more, for example several tens. The antennas of the user equipment 30 may be arranged spaced apart from each other. For example, the two antennas 32 and 33 may be arranged at a top side of the user equipment 30 near the edges. As an alternative, one or more antennas may be arranged at the top side and some other antennas may be arranged at the bottom side of the user equipment 30. Therefore, the distance between two antennas 32, 33 may be in a range of a few centimeters, up to 10 or 15 cm. In case the user equipment 30 is a stationary device or integrated in a vehicle, the antenna separation may be larger, up to 5 or 10 meters.

Operation of the base station 20 and the user equipment 30 will be described in more detail in connection with FIG. 2.

Figure 2:
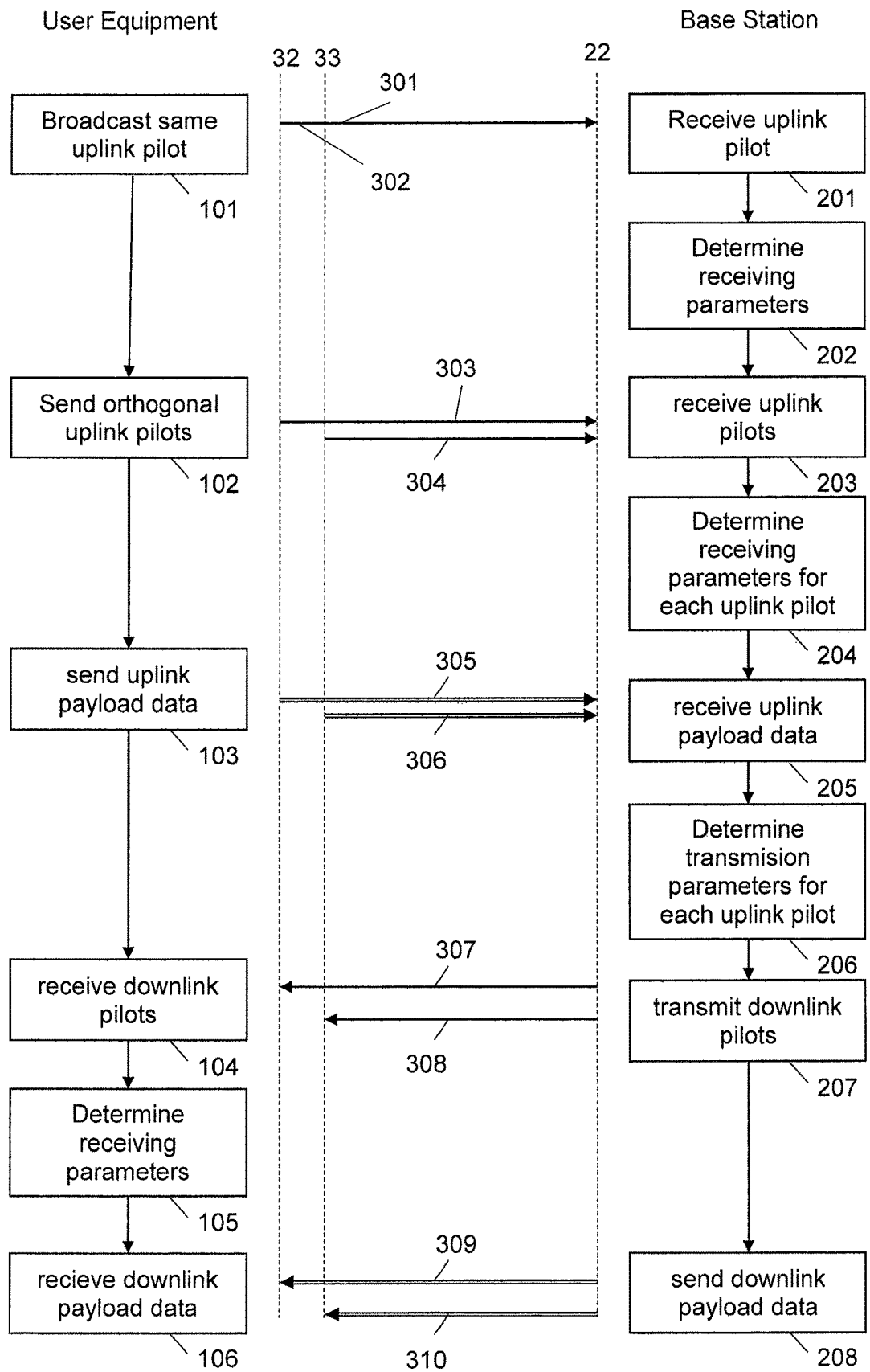
FIG. 2 shows a flow chart comprising method steps according to an embodiment of the present invention.

FIG. 2 shows a flowchart with method steps 101 to 106 performed by the user equipment 30 and method steps 201 to 208 performed by the base station 20. Furthermore, the transmission of radio signals between the antennas 32, 33 of the user equipment 30 and the antenna array 22 of the base station 20 is indicated in FIG. 2 by arrows 301 to 310. In particular, dashed line 32 and dashed line 33 represent the antennas 32 and 33, respectively, of the user equipment 30 and thus a radio signal transmitted from one of these antennas is indicated by an arrow starting at the corresponding dashed line. In the opposite direction, a radio signal received at one of these antennas is indicated by an arrow ending at the corresponding dashed line 32 and 33, respectively. Likewise, dashed line 22 represents the antenna array 22 of the base station 20. It should be noted that in FIG. 2 an arrow formed of a single line represents a radio signal transmission of a pilot signal and an arrow formed of a double line represents a radio signal transmission of payload data.

In step 101 the user equipment 30 broadcasts an uplink pilot signal from each antenna 32 and 33. The pilot signal may include a training sequence and may be a MIMO pilot signal. In particular, the same uplink pilot signal is broadcasted via each antenna indicated by arrows 301 and 302 at the same time. Arrows 301 and 302 appear as a single arrow in FIG. 2 as the same pilot signal is sent from antenna 32 and from antenna 33 at the same time. In case the user equipment 30 comprises more than two antennas 32 and 33, the same uplink pilot signal is broadcasted via all these antennas at the same time. Broadcasting means that the same pilot signal is sent via the antennas without being focused or directed into a specific direction as it is possible in MIMO systems. However, although the same uplink pilot signal is sent via the antennas, the uplink pilot signal may have a different amplitude for each antenna and/or a different phase for each antenna. The amplitude and phase offset for the different antennas may be subject to optimization.

In step 201 the base station 20 receives the same uplink pilot signal 301, 302 from the user equipment 30 at the antenna array 22. It is to be noted that for steps 101 and 201 only one pilot signal resource for transmitting the same pilot signal is required.

In step 202 the base station 20 determines a first set of base station receiving parameters for the antenna array 22 at which the same uplink pilot signal was received from each antenna 32, 33 of the user equipment 30. It is to be noted that in the appended claims the first set of base station receiving parameters are named "first set of first device receiving parameters". The first set of base station receiving parameters are determined according to MIMO techniques. Therefore, the first set of base station receiving parameters are configured such that the antenna array 22 has a directional sensitivity into the direction of the user equipment 30, from which the same uplink pilot signal has been received.

For example, the base station 20 is configured to analyze the same pilot signal received at the antenna array 22 to determine corresponding channel characteristics for radio signal transmissions between the antenna array 22 and the user equipment 30. When the base station 20 is receiving a radio signal from the user equipment 30, the signals received at each antenna 23 of the antenna array 22 are filtered, combined and/or delayed based on the first set of base station receiving parameters such that the radio signal from the user equipment 30 may be received with a large amplitude and signal to noise ratio.

Figure 3:
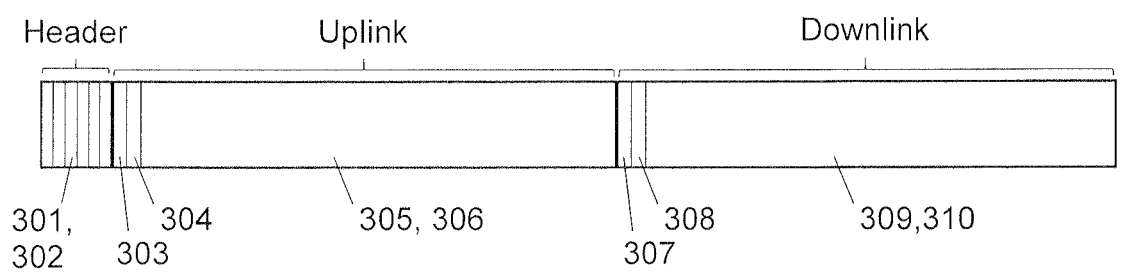
FIG. 3 shows schematically a data transmission frame as it is used according to embodiments of the present invention.

The MIMO system 10 may use a time division multiple access method (TDMA) for the transmission of pilot signals. A pilot time slot may be allocated to each user equipment served by the base station 20. FIG. 3 shows an example of a data transmission frame comprising a header section providing a plurality of time slots for transmitting pilot signals from different user equipment devices. As indicated in FIG. 3, a timeslot for transmitting the same pilot signal 301, 302 from the user equipment 30 may be allocated. In the allocated pilot timeslot, the respective user equipment 30 may transmit its pilot signal 301, 302. The allocation in the time domain ensures that the various user equipment devices do not interfere with each other when transmitting their corresponding pilot signals. However, other orthogonal transmission methods may be used for transmitting the pilot signals, for example a frequency division multiple access (FDMA) or a code division multiple access (CDMA) method.

Returning to FIG. 2, the user equipment sends in step 102 from each antenna 32, 33 a corresponding uplink pilot signal. The corresponding uplink pilot signals are orthogonal to each other. In particular, a first uplink pilot signal 303 is sent from antenna 32 and a second uplink pilot signal 304 which is orthogonal to the first uplink pilot signal 303 is sent from antenna 33. The first and second uplink pilot signals 303, 304 may be transmitted in an uplink payload section of a data transmission frame as indicated in FIG. 3.

The orthogonal uplink pilot signals 303, 304 are received at the antenna array 22 of the base station 20 using the first set of base station receiving parameters in step 203. By using the first set of base station receiving parameters, the antenna array 22 has a directional sensitivity for decoding the first and second orthogonal uplink pilot signals 303, 304 sent from the user equipment 30. Due to the directional sensitivity of the antenna array 22, the first and second orthogonal uplink pilot signals 303, 304 may be used at the same time within the MIMO system 10 by another user equipment communicating with the base station 22, and the base station 22 is capable of separating the orthogonal uplink pilot signals from each user equipment.

In step 204 the base station 20 determines for each received uplink pilot signal 303, 304 a corresponding second set of base station receiving parameters for the antenna array 22 depending on the received orthogonal uplink pilot signals 303, 304. In the appended claims, the second set of base station receiving parameters is called "second set of first device receiving parameters". In detail, the second sets of base station receiving parameters enable to separate radio frequency signals emitted from antenna 32 from those radio frequency signals emitted from antenna 33. This enables a rank 2 uplink communication of payload data transmitted from the user equipment 30 to the base station 20. As shown in FIG. 2, in step 103 the user equipment 30 may sent two uplink payload data streams 305, 306, wherein uplink payload data stream 305 is emitted from antenna 32 and uplink payload data stream 306 is emitted from antenna 33. As shown in FIG. 3, the two uplink payload data streams 305, 306 are transmitted also in the uplink payload section of the data transmission frame. The uplink payload data streams 305, 306 are received in step 205 at the base station 20 which separates the uplink payload data streams 305, 306 using the second sets of base station receiving parameters.

In step 206, based on each of the received uplink pilot signals 303 and 304, the base station 20 may determine a corresponding set of base station transmission parameters for transmitting downlink radio frequency signals. In the appended claims the base station transmission parameters are called "first device transmission parameters". Each corresponding set of the base station transmission parameters may be configured to focus a downlink signal from the antenna array 22 of the base station 20 to that antenna of the user equipment 30 from which the corresponding uplink pilot signal was received. Thus, a set of base station transmission parameters is determined to focus downlink signals to antenna 32 of the user equipment 30, and another set of base station transmission parameters is determined to focus downlink signals to antenna 33 of the user equipment 30. Alternatively, the downlink payload data streams are focused to both antennas simultaneously but with the aid of pilot signals the user equipment is capable of separating the two streams.

For example, for determining a corresponding set of base station transmission parameters for focusing on antenna 32, the logic 21 of the base station 20 may be configured to determine a footprint matrix for the antenna array 22 based on the pilot signal 303 received at the antenna array 22 from antenna 32 of the user equipment 30. The logic 21 may use the footprint matrix to control the plurality of antennas 23 of the antenna array 22 when transmitting radio signals to antenna 32 of the user equipment 30. The logic 21 may compute a Hermitian conjugate of the footprint matrix to determine a time delay and amplitudes of radio signals transmitted by each antenna 23 of the antenna array 22 to focus radio energy in a sector in which the antenna 32 of the user equipment 30 is located. Likewise, a corresponding set of base station transmission parameters for focusing on antenna 33 may be determined.

Optionally, in step 207 the base station 20 may transmit orthogonal downlink pilot signals 307, 308 two each antenna 32, 33 of the user equipment 30. In detail, downlink pilot signal 307 is focused and sent to antenna 32, and downlink pilot signal 308 is focused and sent to antenna 33. The downlink pilot signals 307 and 308 are orthogonal to each other, for example by transmitting them in different timeslots as indicated in FIG. 3. As shown in FIG. 3, the downlink pilot signals 307, 308 may be transmitted within a downlink payload section of the data transmission frame.

In step 104, the user equipment 30 receives at each antenna 32, 33 the corresponding downlink pilot signal 307 and 308, respectively. In step 105 the logic 31 of user equipment 30 determines for each antenna 32, 33 a corresponding set of user equipment receiving parameters based on the received downlink pilot signals 307, 308. In the appended claims, the user equipment receiving parameters are named "second device receiving parameters".

In step 208, the base station 20 sends two downlink payload data streams 309, 310 to the user equipment 30. In particular, the base station 20 sends the downlink payload data stream 309 focused on the antenna 32, and at the same time the base station 20 sends the downlink payload data stream 310 focused on the antenna 33. Thus, a rank 2 downlink transmission can be accomplished. The downlink payload data streams 309, 310 are transmitted in the downlink section of the data transmission frame as shown in FIG. 3. At the user equipment 13, the downlink payload data streams 309, 310 are received in step 106. In particular, by using the above determined user equipment receiving parameters for receiving the downlink payload data streams 309, 310, a signal quality may be enhanced and separation of the two downlink payload data streams may be improved.

To sum up, according to the above-described method, first, the same pilot 301, 302 is transmitted from the user equipment 30 from all antennas 32, 33 simultaneously. Relative phase and amplitude may be subject to optimize receiving parameters at the base station 20. Next, orthogonal uplink pilots 303 and 304 are transmitted from the individual antennas 32, 33 of the user equipment 30, in particular the same number as the intended rank of operation. The uplink pilots 303 and 304r are received at the base station 20 with pilot 301, 302 decoding in order to separate them from traffic from another user equipment. Then, uplink payload is transmitted with the intended rank and can be decoded by the base station 20. Downlink pilots 307, 308 are pre-coded with pilots 303 and 304 in order to focus them to the different antennas 32, 33 of the user equipment 30.

Although in the above description the user equipment 30 comprises only two antennas 32 and 33, and the base station 20 comprises only one antenna arrays 22, the above-described principle may be extended easily to a higher rank. Furthermore, each antenna of the user equipment may comprise a plurality of antenna elements which are controlled via a corresponding antenna port.

The above-described method may be performed with swapped roles, that means that the user equipment comprises the antenna array and the base station comprises the at least two antennas. Consequently, the method starts with sending the same pilot signal from each antenna of the at least two antennas of the base station. The same pilot signal from the base station is received the antenna array of the user equipment. The user equipment determines a first set of user equipment receiving parameters for the antenna array depending on the received same pilot signal. Next, from each antenna of the base station a corresponding pilot signal is sent, wherein these pilot signals are orthogonal to each other. The orthogonal pilot signals are received at the antenna array of the user equipment using the first set of user equipment receiving parameters. At the user equipment, for each received orthogonal pilot signal a corresponding second set of user equipment receiving parameters for the antenna array is determined depending on the received orthogonal pilot signals.

This reversed method may in particular the advantageous at higher transmission frequencies, for example at transmission frequencies above 20 GHz. In this case, the antennas of the base station may focus the energy into static sectors and the user equipment adapts its antenna array dynamically depending on transmission characteristics between the base station and the user equipment.

The invention claimed is:

1. A method for operating a cellular multiple-input and multiple-output, MIMO, system, the cellular MIMO system comprising a first device having an antenna array comprising a plurality of antennas, and a second device comprising at least two antennas, the method comprising:
broadcasting an identical uplink pilot signal from each antenna of the at least two antennas of the second device using a single pilot signal resource,
receiving, at the antenna array of the first device, a signal resulting from transmission of the identical uplink pilot signal from each antenna of the at least two antennas of the second device,
determining, at the first device, a first set of first device receiving parameters for the antenna array depending on the received identical uplink pilot signal,
sending from each antenna of the at least two antennas of the second device a corresponding uplink pilot signal of a plurality of uplink pilot signals, wherein the plurality of uplink pilot signals are orthogonal to each other,
receiving the plurality of uplink pilot signals at the antenna array of the first device using the first set of first device receiving parameters, and
determining, at the first device, for each received uplink pilot signal of the plurality of uplink pilot signals a corresponding second set of first device receiving parameters for the antenna array of a plurality of second sets, depending on the plurality of received orthogonal uplink pilot signals.

2. The method according to claim 1, further comprising:
sending via each antenna of the at least two antennas of the second device corresponding uplink payload data, and
receiving the uplink payload data at the antenna array of the first device using the corresponding second set of first device receiving parameters.

3. The method according to claim 1, further comprising for at least one second set of first device receiving parameters of the second sets of first device receiving parameters:
determining a corresponding set of first device transmission parameters, the corresponding set of first device transmission parameters being configured to focus a downlink signal from the antenna array of the first device to a corresponding antenna of the second device from which the corresponding uplink pilot signal was received.

4. The method according to claim 3, further comprising:
sending from the antenna array of the first device downlink payload data using the corresponding set of first device transmission parameters.

5. The method according to claim 3, further comprising:
sending from the antenna array of the first device a downlink pilot signal using the corresponding set of first device transmission parameters,
receiving at the corresponding antenna of the second device, from which the corresponding uplink pilot signal was received, the downlink pilot signal, and
determining, at the second device, a corresponding set of second device receiving parameters for the corresponding antenna, from which the corresponding uplink pilot signal was emitted, based on the received downlink pilot signal.

6. The method according to claim 5, further comprising:
sending via the antenna array of the first device corresponding downlink payload data using the corresponding set of the first device transmission parameters, and
receiving the downlink payload data at the corresponding antenna of the second device, from which the corresponding uplink pilot signal was emitted, using the set of second device receiving parameters.

7. The method of claim 1, further comprising:
for each received uplink pilot signal:
selecting, at the first device, a corresponding pre-coding from a predefined codebook,
pre-coding a corresponding downlink pilot signal and corresponding downlink payload data stream using the corresponding pre-coding,
sending from the antenna array of the first device the pre-coded corresponding downlink pilot signal and corresponding downlink payload data stream, and receiving, at each antenna of the at least two antennas of the second device, each of the pre-coded corresponding downlink pilot signals and corresponding downlink payload data streams, and separating, in the second device, the corresponding downlink payload data streams based on the corresponding downlink pilot signals and the predefined codebook.

8. The method of claim 1, wherein the cellular MIMO system comprises a further second device comprising at least two antennas, the method comprising:

broadcasting a further identical uplink pilot signal from each antenna of the at least two antennas of the further second device, receiving the further identical uplink pilot signal from the further second device at the antenna array of the first device, determining, at the first device, a third set of first device receiving parameters for the antenna array depending on the received further identical uplink pilot signal, sending from each antenna of the at least two antennas of the further second device a corresponding uplink pilot signal of the plurality of uplink pilot signals, wherein the corresponding uplink pilot signals are the same as the corresponding uplink pilot signals sent from each antenna of the at least two antennas of the second device and are sent at the same time, receiving the plurality of uplink pilot signals at the antenna array of the first device using the third set of first device receiving parameters, and determining, at the first device, for each received uplink pilot signal of the plurality of uplink pilot signals a corresponding fourth set of first device receiving parameters for the antenna array depending on the plurality of received orthogonal uplink pilot signals.

9. The method of claim 1, wherein the first device comprises at least one of a base station of the cellular MIMO system or a user equipment of the cellular MIMO system, and wherein the second device comprises at least one of a base station of the cellular MIMO system or a user equipment of the cellular MIMO system.

10. The method according to claim 9, wherein the user equipment comprises at least one device of a group comprising:
 a mobile telephone,
 a mobile computer,
 a tablet computer,
 a wearable device, or
 a mobile accessory.

11. The method of claim 1, wherein the plurality of uplink pilot signals is sent from each antenna of the at least two antennas of the second device and/or received at the antenna array of the first device in an uplink payload section of a transmission frame.

12. A device for a cellular multiple-input and multiple-output, MIMO, system, the device comprising:

an antenna array comprising a plurality of antennas, and a logic coupled to the antenna array and configured to
 receive, at the antenna array, a signal resulting from transmission of an identical uplink pilot signal from each antenna of at least two antennas of a further device of the MIMO system, the identical uplink pilot signal being broadcasted from the further device from each antenna of the at least two antennas of the further device, determine a first set of device receiving parameters for the antenna array depending on the received identical uplink pilot signal, receive, from the further device, a plurality of orthogonal uplink pilot signals at the antenna array using the first set of device receiving parameters, and determine for each received uplink pilot signal of the plurality of orthogonal uplink pilot signals a corresponding second set of device receiving parameters for the antenna array depending on the plurality of received orthogonal uplink pilot signals.

13. A device for a cellular multiple-input and multiple-output, MIMO, system, the device comprising:
 at least two antennas, and
 a logic coupled to the at least two antennas and configured to
  broadcast an identical uplink pilot signal from each antenna of the at least two antennas using a single pilot signal resource, and
  after broadcasting the identical uplink pilot signal, send from each antenna of the at least two antennas a corresponding uplink pilot signal of a plurality of uplink pilot signals, wherein the plurality of uplink pilot signals are orthogonal to each other.

14. A cellular multiple-input and multiple-output, MIMO, system, comprising:
 a first device comprising:
  an antenna array comprising a plurality of first antennas, and
  a logic coupled to the antenna array;
 a second device comprising:
  at least two second antennas, and
  a logic coupled to the at least two second antennas;
 wherein the first device is configured to perform operations comprising:
  receiving, at the antenna array, a signal resulting from transmission of an identical uplink pilot signal from each of the at least two second antennas of the second device of the MIMO system, the same uplink pilot signal being broadcasted from the second device from each antenna of the at least two second antennas of the second device,
  determining a first set of device receiving parameters for the antenna array depending on the identical uplink pilot signal that was received,
  receiving, from the second device, a plurality of uplink pilot signals at the antenna array using the first set of device receiving parameters, and
  determining for each received uplink pilot signal of the plurality of uplink pilot signals a corresponding second set of device receiving parameters for the antenna array depending on the plurality of the uplink pilot signals that were received; and
 wherein the second device is configured to perform operations comprising:
  broadcasting the identical uplink pilot signal from each antenna of the at least two second antennas, and
  sending from each antenna of the at least two second antennas a corresponding uplink pilot signal of the plurality of uplink pilot signals,
 wherein the plurality of uplink pilot signals are orthogonal to each other.

* * * * *